Nov. 16, 1926.                                                     1,607,389
                              C. CLAUS
    PRESSED METAL ARTICLE AND METHOD OF AND MACHINE FOR MAKING SAME
              Original Filed Oct. 26, 1923    2 Sheets-Sheet 2
Fig.3.            Fig.4.
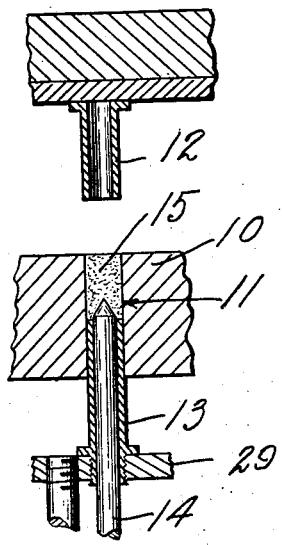   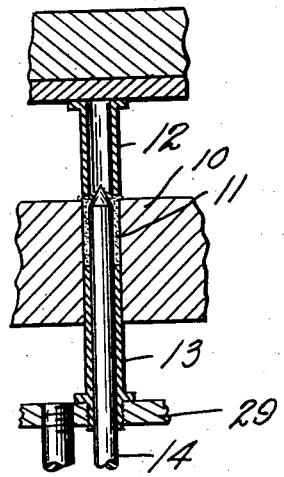
Fig.5.            Fig.6.
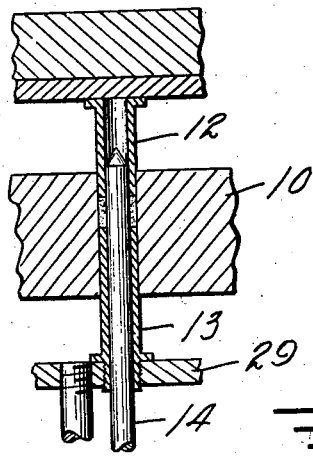   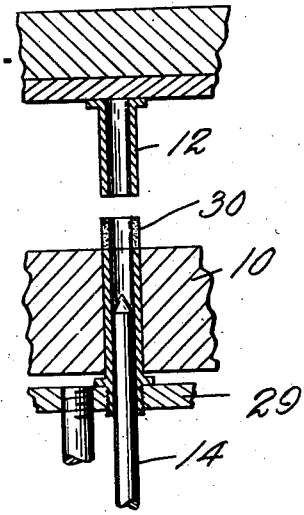
Fig.7.
INVENTOR
Carl Claus
BY
Willis Fowler.
ATTORNEY Patented Nov. 16, 1926.

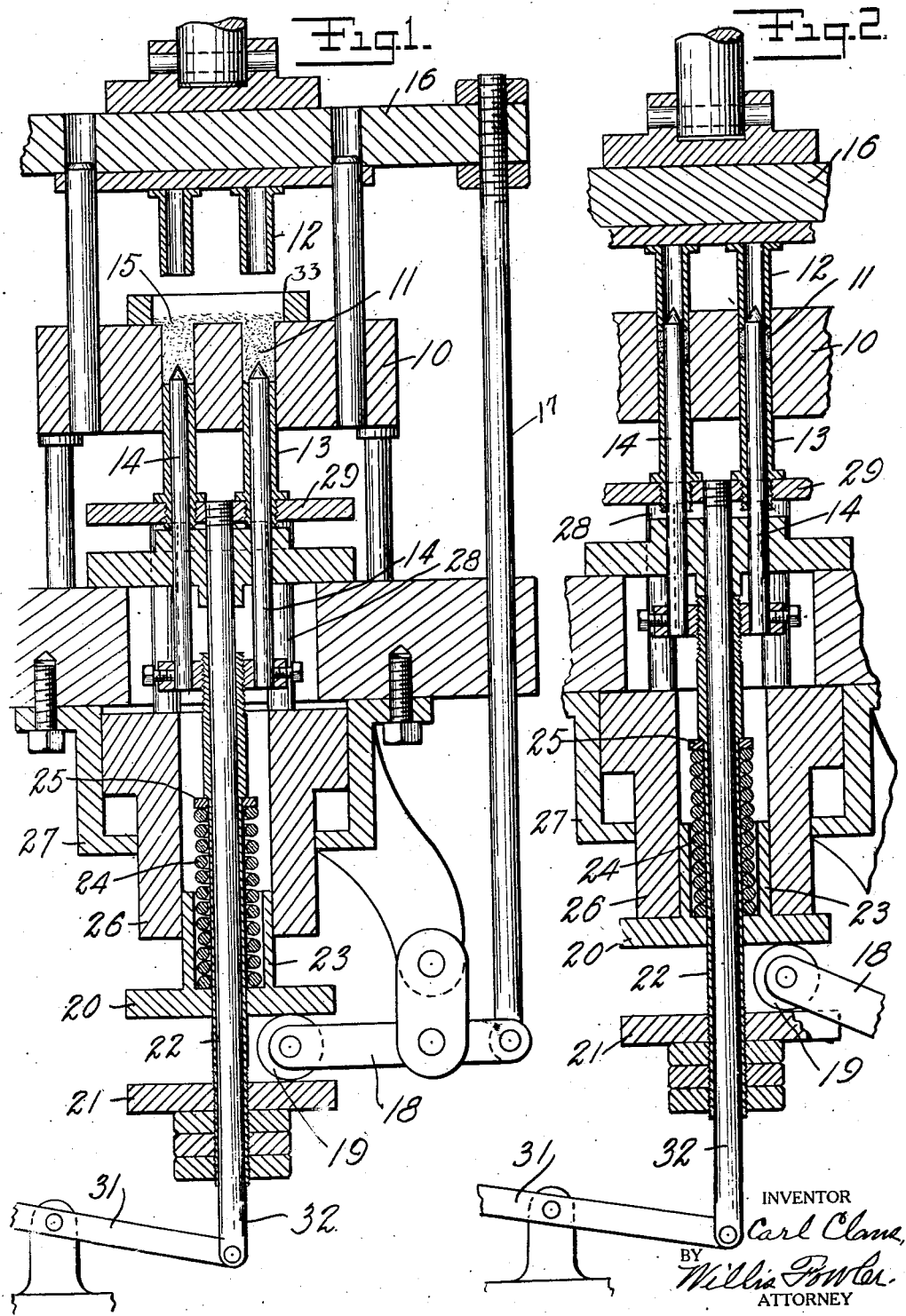

1,607,389

UNITED STATES PATENT OFFICE.

CARL CLAUS, OF PLAINFIELD, NEW JERSEY, ASSIGNOR TO BOUND BROOK OIL-LESS BEARING COMPANY, OF BOUNDBROOK, NEW JERSEY, A CORPORATION OF NEW JERSEY.

PRESSED-METAL ARTICLE AND METHOD OF AND MACHINE FOR MAKING SAME.

Application filed October 26, 1923, Serial No. 671,032. Renewed April 2, 1926.

This invention relates generally to means and to a method for forming articles of compressed powdered or plastic materials, and more particularly to the making of bearings and bushings of compositions, at least one ingredient of which is of a liquid-absorbing nature which gives the product a desirable porous character.

In the manufacture of bearings and bushings of metals and materials having a low coefficient of friction, I have found it advantageous to form the article by compacting or compressing a mixture of finely divided ingredients in a mold and then to apply heat to the compressed article to consolidate the mixture and produce a bearing or bushing having the desired homogeneity and strength.

In the formation of the compressed bushing of compressed material, it is necessary, particularly where the bushings have relatively thin walls, to take special precautions to insure the proper filling of the narrow mold spaces with the powdered material to produce a uniform density and thickness of the finished article. It is also desirable to decrease as far as possible the friction encountered in the forcing or ejecting of the formed bushing from the mold to thereby facilitate the removal of the article from the compressing mold and its transfer to a suitable heat-treating apparatus with a minimum amount of fracture and breakage.

I have succeeded in achieving these desirable results and in accomplishing the production of an improved bearing or bushing of the general type referred to, by the use of means including a mold having a removable core-member which is adapted to be moved longitudinally to position to shape or produce an annular mass arrangement of a quantity of material previously placed in the mold cavity. Following the pressing operation in the mold, which is preferably brought about by forcing annular die-members toward each other to compress between them the material in the annular space between the core-member and the inner surface of the mold chamber, the core-member is withdrawn. Following the withdrawal of the core-member after compression, one of the annular dies is pushed through the full length of the mold cavity to thereby eject the newly pressed bushing from the mold, whereupon the said die is withdrawn to place the parts in position for another cycle of operations, such as the one described.

In thus making a bushing from powdered ingredients comprising lubricating materials, including the so-called bearing-metals, the article after pressing is relatively fragile, although so highly compressed as to present a smooth, lustrous surface, and at the same time possesses a desirable degree of porosity to enable it to subsequently absorb and store oil. In order to provide the necessary homogeneity, strength and hardness, the pressed bushing is transferred to a suitable oven or furnace where it is heat-treated to produce the desired consolidation of the particles and provide a coherent and unitary mass. Following the heat treatment, the bushings are soaked in oil and then subjected to the action of a set of sizing-dies which complete the operations and produce a finished bushing that at no stage of its construction has been subjected to the action of a cutting tool.

In the drawings, in which a preferred embodiment of the invention has been selected for illustration:

Fig. 1 is a vertical sectional view of a bushing forming machine embodying the invention and showing the relation of the parts at the beginning of an operation.

Fig. 2 is a similar view to Fig. 1, showing the relation of the parts at the completion of a bushing pressing operation.

Fig. 3 is a sectional detail view showing the bushing forming parts in position to produce the first step in a forming operation.

Fig. 4 is a view similar to Fig. 3, showing the position of the parts at the end of a core advancing operation.

Fig. 5 is a view similar to Fig. 3, showing the position of the parts at the end of a compressing operation.

Fig. 6 is a view similar to Fig. 3, showing the relation of the parts at the end of a work-ejecting operation.

Fig. 7 is a view partly in side elevation and partly in section of a bushing formed and compressed in accordance with the invention.

Referring to the drawings for a more detailed description of the invention, a mold-member 10 is shown in which there are a pair of cylindrical mold-chambers 11 which extend through the body of the mold-member and are adapted to receive the annular die-members 12 and 13 which are arranged to be pressed into the mold-chambers from opposite ends thereof.

In order to produce annular articles in the mold device described, a core-member 14 is made use of which occupies an axially and centrally disposed position in the mold during an operation of the dies.

In order to facilitate the operation of charging the mold with material preparatory to a forming operation and also to reduce the friction of operation and also to reduce the frictional resistance to removal of the formed article from the mold, the core 14 is movably mounted to reciprocate along its length into and out of a core-position within the mold-member, the core-member being mounted to slide axially and vertically upward within the bore of the lower annular die-member 13.

In operation, the parts of the mold apparatus are brought to the relative positions shown in Fig. 1 of the drawings, the annular die-members being arranged in their separated relation and the core-member or mandrel 14 being withdrawn to a lowered position clear of the mold-chamber 11. A charge of material 15, which may be of any suitable finely divided ingredients, which for example may include any well known solid lubricating material as an ingredient, is then deposited in the mold-chamber opening, this operation being greatly facilitated by the withdrawn position of the core-member, to thereby provide a relatively large opening or recess into which to deposit the charge which is acted upon by gravity to provide a mass of uniform density or compactness, without tamping or packing. After the charge of granulated material 15, has been fed into the mold-chambers 11 so as to completely fill them with this comparatively heavy material, a loose ring 33, which encompasses the mouths of the mold-chambers and is free to move on the surface of the block 10, is slid by hand across the chambers so as to clear away the surplus material of the charge. It will be clear that were the core-member in position in the mold during the filling operation, the narrowness of the annular space into which the material would be placed would interfere with the complete and uniform filling of the space with the charge. By my method I avoid the formation of holes and weakened places in the walls of the formed body.

Following the deposit of the charge in the mold chamber, as shown in Figs. 1 and 3, the core-member 14 is raised to the elevated position shown in Fig. 4. This upward movement of the core-member through the center of the mass of material produces an annular arrangement and shaping of the mass as indicated in Fig. 4. A complete and uniform filling of the annular space is thus obtained and to some extent a compacting and concentration of the loose material is also produced by the upward movement of the core or mandrel 14.

The elevation of the mandrel 14 to a position wherein it penetrates the mass of material 15 and produces an annular disposition of the contents of the mold-chamber is accomplished in the first part of the descending movement of a reciprocating head 16, which carries the upper die-members 12, 12. A vertically movable rod 17 connects the reciprocating head 16, with one end of a rocking arm 18 which carries at the other end a roller 19 bearing against the confronting surfaces of a pair of separated plates or abutment members 20 and 21. The lower abutment member 21 is rigidly connected to a sleeve 22 which is directly connected to the mandrels 14 and the upper plate 20 has a limited sliding movement on the sleeve. Above the upper surface of the plate 20 and housed in an annular extension 23 thereon is a spring 24 which bears at its upper end against a washer or shoulder 25 carried by the sleeve. It will be seen that with this structural arrangement the elevation of the inner end of the arm 18 carries with it the plate 20 and, through the intervening spring 24, exerts pressure on the abutment 25 to lift the sleeve and thereby elevate the plungers or mandrels 14.

The continued descending movement of the head 16 brings the lower ends of the die-members 12 into engagement with the material in the mold with the result that a powerful pressure is exerted on the annular mass to produce a comparatively rigid unitary annular body. In the last stage of the descending movement of the head, the plate 20 is elevated by the arm 18 into engagement with an annular abutment member 26 which slides in a sleeve 27 and, through a pair of vertical posts 28, lifts a plate 29. The plate 29 directly engages the lower extremities of the lower die-members 13 and the upward movement of the dies 13 produces a desirable end pressure directly against the lower end of the material in the mold at the same time that the maximum pressure is applied at the upper end. This operation insures the production of an equal degree of density throughout the whole length of the annular shaped member produced in the mold because of the simultaneous compression applied to opposite ends.

The reverse or upward movement of the head 16 removes the upper dies 12 from the mold chambers and at the same time withdraws the mandrels 14 as indicated in Fig. 6 of the drawings. The removal of the mandrel from its position in the bore of the newly pressed annular member 30 greatly decreases the frictional resistance to the removal of the bushing from the die in the next operation. The discharge or ejection of the annular member 30 from the mold is effected through the operation of the foot-lever 31 which has a hinged connection at one end with a plunger 32 slidably mounted in the sleeve 22 and connected at its upper end to the plate 29 in which the lower die-members 13 are seated. It will be seen that the operation of the foot-lever lifts the plunger 32 and the plate 29 to thereby elevate the die-members 13 to the ejecting positions shown in Fig. 6.

The compressed annular members 30 thus obtained, which in the particular application of the invention herein intended, are to be used for bearings and bushings, may then be heat treated, immersed in oil, a considerable portion of which is taken up by the interspersed absorbent material, and the article is then subjected to the action of a sizing die to produce a finished, composite bearing or bushing without the use of a cutting tool.

The referred to means and method for producing bearings and bushings is clearly applicable for use in the manufacture of other annular articles, formed of powdered or plastic materials, for other purposes such as tubular bodies made of porcelain, bakelite, smokeless powder and other materials.

I find that my improvements are particularly applicable in the manufacture of bearings and bushings formed of a combination of various different metals, which are known to be adapted for making composite bearings, together with suitable materials, which as ingredients will increase the absorbent quality of the product in its oil receiving capacity.

What is claimed is:

1. In a device for forming annular bodies, a mold chamber, a movable core-forming mandrel normally withdrawn from said chamber to permit the charging of material into the unobstructed chamber and means for moving said mandrel longitudinally to a position in the chamber wherein it will dispose the loose charged material in an annular mass, and a pair of annular die members movable toward each other in the opposite ends of the mold chamber whereby to compress the intervening mass of material.

2. In a device for forming annular bodies, a mold chamber, a movable core-forming mandrel normally withdrawn from said chamber to permit the charging of material into the chamber and means for moving said mandrel longitudinally to a position in the chamber wherein it will dispose the uncompressed charged material in an annular mass, a pair of annular die members movable toward each other in the opposite ends of the mold chamber whereby to compress the intervening mass of material, and means for withdrawing the mandrel before removing the compressed member from the mold.

3. In a device for forming annular bodies, a mold chamber, a movable core-forming mandrel normally withdrawn, means for moving said mandrel to permit the charging of material into the chamber and to be moved longitudinally to a position in the chamber wherein it will dispose the uncompressed charged material in an annular mass, a pair of annular die members movable toward each other in the opposite ends of the mold chamber whereby to compress the intervening mass of material, means for withdrawing the mandrel and one of the die members from the compressed body, and means for moving the other die member into the mold chamber to eject the compressed member therefrom.

4. In a device for forming annular bushings, a mold member having a vertically disposed cylindrical opening extending therethrough, a vertically movable annular die member having therein a vertically reciprocating core-forming mandrel normally withdrawn to cooperate with said annular-die member to close the lower end of the mold chamber, means for charging powdered metal and graphite into the mold chamber, means for moving the mandrel upwardly through the charge of uncompressed material to dispose the material in an annular mass, an annular die member adapted to be moved downwardly into the upper end of the mold chamber, said die members being moved toward each other in the opposite ends of the mold chamber to compress the material therein.

5. The herein described method of making pressed bodies from compressible material, which consists in filling a coreless mold with said charge of material, then in forcing a core from the other end of the mold through the uncompressed mass of said material and forming the charge about said core, then in compressing said charge endwise from both ends to compact it, and then in subjecting said compressed body to heat to harden it.

6. That method of making annular bodies which consists in withdrawing a core-forming mandrel from a mold chamber, then in charging material into the unobstructed chamber, then in moving the mandrel into the mold to dispose the uncompressed charge of material in an annular mass, and then in forcing an annular die into the opposite ends of the mold to compress the annular mass of material therein.

7. That method of making annular bodies which consists in withdrawing a core-forming mandrel from a mold chamber, then in charging material into the chamber, then in moving the mandrel into the mold to dispose the material in an annular mass, and then in forcing annular die members toward each other in the mold chamber to compress between them the annular mass of material therein.

8. That method of making annular bodies which consists in withdrawing a core-forming mandrel from a mold chamber, then in charging material into the chamber, then in moving the mandrel into the mold to dispose the material in an annular mass, then in forcing annular die members toward each other in the mold chamber to compress between them the annular mass of material, then in withdrawing one of the die members and the mandrel, and then in removing the compressed body from the mold.

9. That method of making annular bodies which consists in withdrawing a core-forming mandrel from a mold chamber, then in charging material into the chamber, then in moving the mandrel into the mold to dispose the material in an annular mass, then in forcing annular die members toward each other in the mold chamber to compress between them the annular mass of material then in withdrawing one of the die members and the mandrel, and then in forcing the other die member into the mold to eject the formed article therefrom.

10. That method of making a porous self-lubricating bearing of consolidated finely divided metals, which consists in charging a mold with a mixture of loose finely divided metals, then compressing the charge simultaneously from opposite points to compact the same and make it uniformly dense, then heat-treating the compressed body and making the same porous.

11. A self-lubricating bearing made of a composition including solid lubricating material, said bearing being formed by compressing the composition from opposite directions to produce uniform density.

12. A self-lubricating bearing made of a compressed mixture of finely divided metals compressed from opposite points into a consolidated mass.

13. A self-lubricating bearing made of a compressed mixture of finely divided materials compressed from opposite places into a consolidated mass heat-treated and porous and compressed to size.

In testimony whereof, I have hereunto set my hand.

CARL CLAUS.